United States Patent
Wang et al.

(10) Patent No.: US 10,025,411 B2
(45) Date of Patent: Jul. 17, 2018

(54) TOUCH SCREEN AND PRESSURE TOUCH DETECTION METHOD THEREOF

(71) Applicant: BOE TECHNOLOGY GROUP CO., LTD., Beijing (CN)

(72) Inventors: Xuefei Wang, Beijing (CN); Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/504,810

(22) PCT Filed: Mar. 10, 2016

(86) PCT No.: PCT/CN2016/076056
§ 371 (c)(1),
(2) Date: Feb. 17, 2017

(87) PCT Pub. No.: WO2017/045382
PCT Pub. Date: Mar. 23, 2017

(65) Prior Publication Data
US 2017/0269756 A1    Sep. 21, 2017

(30) Foreign Application Priority Data
Sep. 17, 2015   (CN) .......................... 2015 1 0595027

(51) Int. Cl.
*G06F 3/041*    (2006.01)
*G06F 3/044*    (2006.01)

(52) U.S. Cl.
CPC ............ *G06F 3/0414* (2013.01); *G06F 3/044* (2013.01); *G06F 2203/04104* (2013.01); *G06F 2203/04106* (2013.01); *G06F 2203/04107* (2013.01)

(58) Field of Classification Search
CPC .............................. G06F 3/041–3/047; G06F 2203/04102–2203/04108; G06F 2203/04111–2203/04112; H04M 1/0268
(Continued)

(56) References Cited

U.S. PATENT DOCUMENTS 8,188,982 B2    5/2012   You et al.
8,988,384 B2 *  3/2015   Krah ..................... G06F 3/0414
                                                      178/18.05
(Continued)

FOREIGN PATENT DOCUMENTS

CN      102103445 A    6/2011
CN      103064537 A    4/2013
(Continued)

OTHER PUBLICATIONS

Office Action issued by the Chinese Patent Office in the priority Chinese application No. 201510595027.4 dated Apr. 25, 2016.
(Continued)

*Primary Examiner* — Roberto Flores
(74) *Attorney, Agent, or Firm* — Dilworth & Barrese, LLP.; Michael J. Musella, Esq.

(57) ABSTRACT

A touch screen and a pressure touch detection method thereof are disclosed and belong to a technical field of display. The touch screen includes a touch module including a plurality of sense electrodes and a plurality of touch electrodes, wherein the sense electrodes and the touch electrodes are respectively arranged in different layers. The touch screen has a display region and a non-display region, and at least one pressure sensor is arranged in the non-display region and includes a first electrode and a second electrode, the first electrode and the sense electrodes are arranged on a same layer, the second electrode and the touch electrodes are arranged on a same layer, and the pressure
(Continued)

sensor detects a touch pressure according to a distance variation between the first electrode and the second electrode. The touch screen is applicable to a small-sized touch display apparatus.

17 Claims, 2 Drawing Sheets

(58) Field of Classification Search
USPC .................................. 345/173–178
See application file for complete search history.

(56) References Cited

U.S. PATENT DOCUMENTS

| | | | | |
|---|---|---|---|---|
| 9,459,160 | B2* | 10/2016 | Shaw | G01L 1/146 |
| 9,715,301 | B2* | 7/2017 | Kuboyama | G06F 3/0414 |
| 2007/0236466 | A1* | 10/2007 | Hotelling | G06F 3/044 |
| | | | | 345/173 |
| 2008/0018611 | A1* | 1/2008 | Serban | G06F 3/0416 |
| | | | | 345/173 |
| 2009/0133941 | A1 | 5/2009 | Endo | |
| 2010/0128002 | A1* | 5/2010 | Stacy | G06F 3/016 |
| | | | | 345/174 |
| 2011/0050625 | A1* | 3/2011 | Kim | G06F 3/044 |
| | | | | 345/174 |
| 2011/0057899 | A1* | 3/2011 | Sleeman | G01L 1/146 |
| | | | | 345/174 |
| 2011/0115738 | A1* | 5/2011 | Suzuki | G01L 1/205 |
| | | | | 345/173 |
| 2011/0141052 | A1* | 6/2011 | Bernstein | G06F 3/016 |
| | | | | 345/174 |
| 2011/0148811 | A1* | 6/2011 | Kanehira | G06F 3/044 |
| | | | | 345/174 |
| 2013/0033450 | A1* | 2/2013 | Coulson | G06F 3/044 |
| | | | | 345/174 |
| 2013/0082970 | A1* | 4/2013 | Frey | G06F 3/0414 |
| | | | | 345/173 |
| 2013/0120312 | A1* | 5/2013 | Takahashi | G06F 3/0418 |
| | | | | 345/174 |
| 2013/0285973 | A1* | 10/2013 | Elias | G06F 3/044 |
| | | | | 345/174 |
| 2014/0043289 | A1* | 2/2014 | Stern | G06F 3/044 |
| | | | | 345/174 |
| 2014/0085213 | A1* | 3/2014 | Huppi | 345/173 |
| 2015/0002458 | A1* | 1/2015 | Lee | G06F 3/045 |
| | | | | 345/174 |
| 2016/0062505 | A1* | 3/2016 | Hwang | G06F 3/0412 |
| | | | | 345/174 |
| 2016/0070398 | A1* | 3/2016 | Worfolk | G06F 3/044 |
| | | | | 345/174 |
| 2016/0195955 | A1* | 7/2016 | Picciotto | G06F 3/044 |
| | | | | 345/174 |
| 2016/0328065 | A1* | 11/2016 | Johnson | G06F 3/03545 |
| 2016/0328079 | A1* | 11/2016 | Schwartz | G06F 3/0416 |
| 2017/0045992 | A1* | 2/2017 | Lee | G06F 3/0416 |
| 2017/0068372 | A1* | 3/2017 | Kim | G06F 3/0412 |
| 2017/0147109 | A1* | 5/2017 | Elias | G06F 3/044 |

FOREIGN PATENT DOCUMENTS

| | | |
|---|---|---|
| CN | 103069365 A | 4/2013 |
| CN | 104423739 A | 3/2015 |
| CN | 104423741 A | 3/2015 |
| CN | 105183257 A | 12/2015 |
| CN | 204926044 U | 12/2015 |

OTHER PUBLICATIONS

International Search Report (ISR) of international application PCT/CN2016/076056 dated Jun. 20, 2016.

* cited by examiner

TOUCH SCREEN AND PRESSURE TOUCH DETECTION METHOD THEREOF

TECHNICAL FIELD

Embodiments of the present disclosure belong to a technical field of display, and particularly relate to a touch screen and a pressure touch detection method thereof

BACKGROUND

Touch screens have become the main human-computer interaction means of personal mobile communication devices and integrated information terminals, e.g., a tablet computer, a smart phone and a super notebook computer, due to advantages of operability, visuality, flexibility and the like. The touch screens can be divided into four main types of a resistive touch screen, a capacitive touch screen, an infrared touch screen, a surface acoustic wave (SAW) touch screen and the like according to different touch principles, among which the capacitive touch screen has a multipoint touch function, short response time, a long service life and relatively high transmittance, and superior user experience; and meanwhile, along with gradual maturity of manufacturing processes, yield is obviously improved, the price of the capacitive screen is reduced increasingly, and currently, capacitive touch screens have become the main technology for touch interaction of small and medium-sized information terminals.

The capacitive touch screens suffer from the defect that it is vulnerable to the environment, and in the case where a user touches a capacitive touch screen when wearing gloves or touches it with a finger with water, or when the capacitive touch screen is used outdoors on a rainy day, a snowy day or the like, it is difficult for the capacitive touch screen to accurately capture the generated touch behavior. Meanwhile, the capacitive touch screen has a problem of causing a touch misoperation by relatively high sensitivity when the finger is suspended in the air above the touch screen. Moreover, the capacitive touch screen only senses a touch position on a plane (X-axis, Y-axis two-dimensional space) where a screen body is positioned, and it is difficult to support sensing of the touch parameters of a plane (Z axis) perpendicular to the screen body.

SUMMARY

The present disclosure aims to solve the technical problem of, aiming at the foregoing problems of existing touch screens, providing a touch screen capable of implementing three-dimensional multipoint touch and a pressure touch detection method thereof.

In order to solve the technical problem of the present disclosure, a technical solution to be adopted is to provide a touch screen, including a display module and a touch module positioned on a side of a light exiting surface of the display module. The touch module includes a plurality of sense electrodes and a plurality of touch electrodes, which are sequentially arranged above the display module, wherein the plurality of sense electrodes and the plurality of touch electrodes are respectively arranged in different layers and are insulated from each other. The touch screen has a display region and a non-display region surrounding the display region, and at least one pressure sensor is arranged in the non-display region, the pressure sensor includes a first electrode and a second electrode, the first electrode and the sense electrodes are arranged on a same layer, the second electrode and the touch electrodes are arranged on a same layer, and each pressure sensor is configured to detect a touch pressure according to a distance variation between the first electrode and the second electrode.

Preferably, the first electrode, the second electrode, the touch electrodes and the sense electrodes are all connected with a same touch chip via respective connecting lines.

Further preferably, an electrostatic shielding wire is further arranged in the non-display region of the touch screen; the connecting lines connected with the sense electrodes and the touch electrodes are positioned on a side of the electrostatic shielding wire, which is close to the display region; and the connecting lines connected with the first electrodes and the second electrodes are positioned on a side of the electrostatic shielding wire, which faces away from the display region.

Preferably, the first electrode, the second electrode, the touch electrodes and the sense electrodes are all made of a same material.

Further preferably, the materials of all the first electrode, the second electrode, the touch electrodes and the sense electrodes are indium tin oxide.

Preferably, a layer where the first electrode is positioned and a layer where the second electrode is positioned are insulated and fixed mutually by adhesive.

Further preferably, the adhesive is an optical clear adhesive.

Preferably, one pressure sensor is arranged on each corner of the touch screen.

Preferably, the touch screen further includes a frame, and the frame packages a side of the display module, which faces away from the light exiting surface.

Preferably, the touch screen is applied to any one of a mobile phone, a pad and a notebook computer.

In order to solve the technical problem of the present disclosure, a technical solution to be adopted is to provide a pressure touch detection method of a touch screen, for use in the touch screen described above; and the pressure touch detection method includes: detecting a pressure used for touch, according to a distance variation between a first electrode and a second electrode.

Preferably, detecting the pressure used for touch according to the distance variation between the first electrode and the second electrode includes: determining a variation of capacitance by detecting the distance variation between the first electrode and the corresponding second electrode, and calculating pressure data according to the variation of the capacitance, so as to judge the pressure used for touch.

The present disclosure has at least an advantageous effect as follows:

According to the present disclosure, an insulating layer is sandwiched between the layer where the first electrode is positioned and the layer where the second electrode is positioned, i.e., a dielectric layer is arranged, and thus, when a pressure is acted on the second electrode, the dielectric layer is compressed, a distance between the first electrode and the second electrode is reduced, and according to a plate capacitance formula $C=(\varepsilon \cdot S)/d$, the distance between the electrodes is decreased, and the capacitance is increased. Namely, in the embodiment, in essence, the size of the pressure is detected by measuring the capacitance between two electrodes so as to implement touch in a direction perpendicular to a screen body, i.e., a Z-axis direction.

Reference signs: 1—display module; 11—backlight source; 12—display panel; 2—touch module; 21—sense electrode; 22—touch electrode; 3—pressure sensor; 31—first electrode; 32—second electrode; 4—adhesive; 5—cover glass; 6—frame; 7—electrostatic shielding wire.

DETAILED DESCRIPTION

In order to make those skilled in the art understand the technical solution of the present disclosure more clearly, the present disclosure will be further described in details in connection with the drawings and the specific embodiments.

Figure 1:
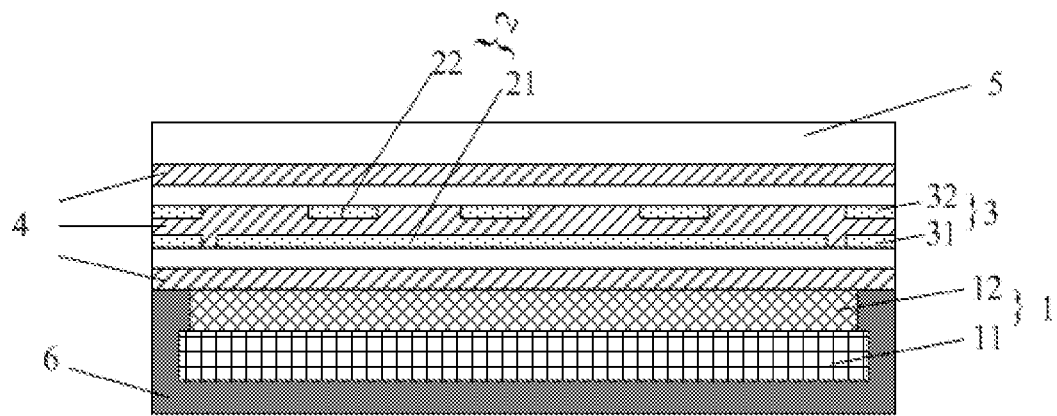
FIG. 1 is a structural schematic diagram of an existing touch screen of embodiment 1 of the present disclosure.

Embodiment 1:

As illustrated in FIG. 1, the embodiment provides a touch screen, including a display module 1 and a touch module 2 positioned on a side of a light exiting surface of the display module 1. The display module 1 includes a display panel 12 and a backlight source 11, and the touch module 2 includes a plurality of sense electrodes 21 and a plurality of touch electrodes 22, which are sequentially arranged above the display module 1; the plurality of sense electrodes 21 and the plurality of touch electrodes 22 are respectively arranged in different layers and are insulated from each other; the touch screen has a display region (AA region) and a non-display region surrounding the display region, and at least one pressure sensor 3 is arranged in the non-display region; and the pressure sensor includes a first electrode 31 and a second electrode 32, wherein the first electrode 31 of the pressure sensor 3 and the sense electrodes 21 are arranged on a same layer, the second electrode 32 and the touch electrodes 22 are arranged on a same layer, and the pressure sensor 3 detects a touch pressure according to a distance variation between the first electrode 31 and the second electrode 32.

According to the touch screen of the embodiment, the display region is provided with a conventional multipoint capacitive touch screen body, the capacitive touch screen body is an object directly interacting with a user, an outer surface (the light exiting surface) is scratch-resistant cover glass 5, the glass 5 is adhered to the side of the light exiting surface of the touch module 2 by adhesive 4, and the plurality of sense electrodes 21 and the plurality of touch electrodes 22, which are made of a transparent conductive material, are respectively arranged with an X axis and a Y axis on a plane of the touch module 2 to form an interactive capacitive matrix so as to implement detection on a capacitance variation caused by touch of a human body. Particularly, the pressure sensor(s) 3 is further arranged in the non-display region of the touch screen of the embodiment, the first electrode 31 of the pressure sensor 3 and the sense electrodes 21 are arranged on the same layer, and the second electrode 32 of the pressure sensor 3 and the touch electrodes 22 are arranged on the same layer for detecting the touch pressure according to the distance variation between the first electrode 31 and the second electrode 32. Specifically, an insulating layer is sandwiched between the layer where the first electrode 31 is positioned and the layer where the second electrode 32 is positioned, i.e., a dielectric layer is arranged, and thus, when a pressure is applied onto the second electrode 32, the dielectric layer is compressed, the distance between the first electrode 31 and the second electrode 32 is reduced, and according to a plate capacitance formula $C=(\varepsilon \cdot S)/d$, the distance between the electrodes is decreased, and capacitance is increased. Namely, in the embodiment, in essence, the size of the pressure is detected by measuring the capacitance between two electrodes so as to implement touch in a direction perpendicular to the screen body, i.e., a Z-axis direction. It can thus be understood that the touch screen in the embodiment has a three-dimensional (X, Y and Z axes) multipoint touch function.

Preferably, in the embodiment, the first electrodes 31, the second electrodes 32, the touch electrodes 22 and the sense electrodes 21 are all connected with the same touch chip via respective connecting lines so as to implement integration of the touch module 2 and the pressure sensors 3, thereby making the integration level of the touch screen higher and reducing cost further.

Figure 4:
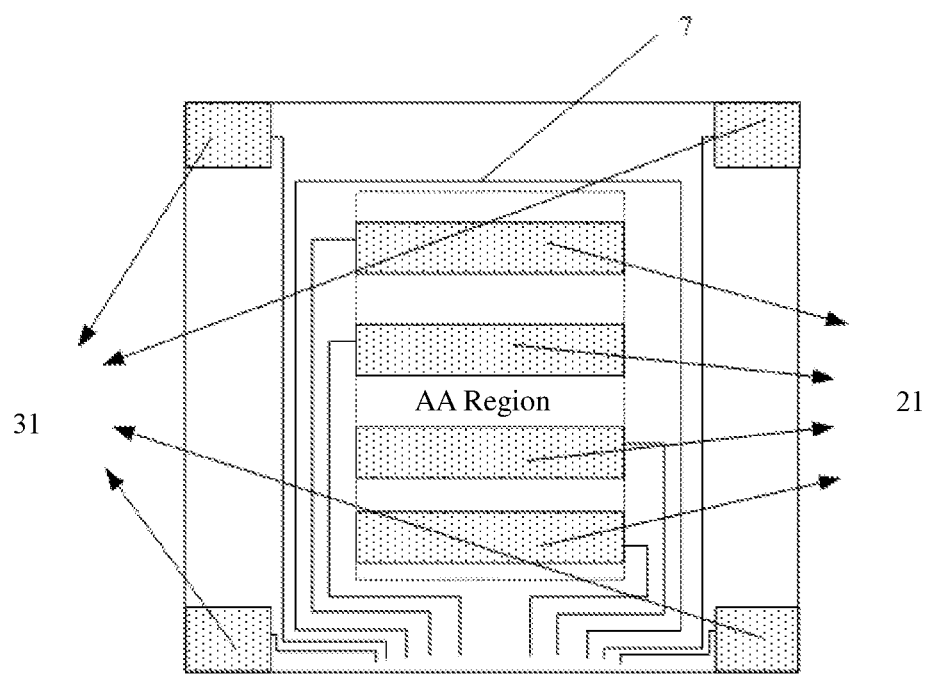
FIG. 4 is a wiring schematic diagram of an electrostatic shielding wires and electrode connecting lines in the touch screen of Embodiment 1 of the present disclosure.

Further, as illustrated in FIG. 4, an electrostatic shielding wire 7 is also arranged in the non-display region of the touch screen; the connecting lines connected with the sense electrodes 21 and the touch electrodes 22 are positioned on a side of the electrostatic shielding wire 7, which is close to the display region; and the connecting lines connected with the first electrodes 31 and the second electrodes 32 are positioned on a side of the electrostatic shielding wire 7, which side faces away from the display region. It can thus be seen that the electrostatic shielding wire 7 is arranged between the connecting lines connected with the touch electrodes 22 and the sense electrodes 21 and the connecting lines connected with the first electrodes 31 and the second electrodes 32, and thus, signal interference can be effectively avoided, so that performance of the touch screen becomes more excellent.

Figure 2:
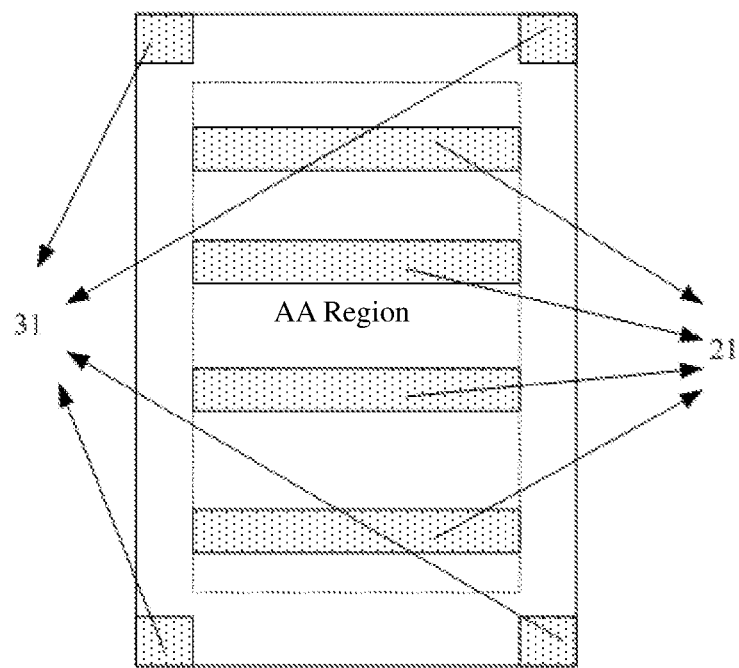
FIG. 2 is a schematic diagram of first electrodes and sense electrodes in the touch screen of embodiment 1 of the present disclosure.
Figure 3:
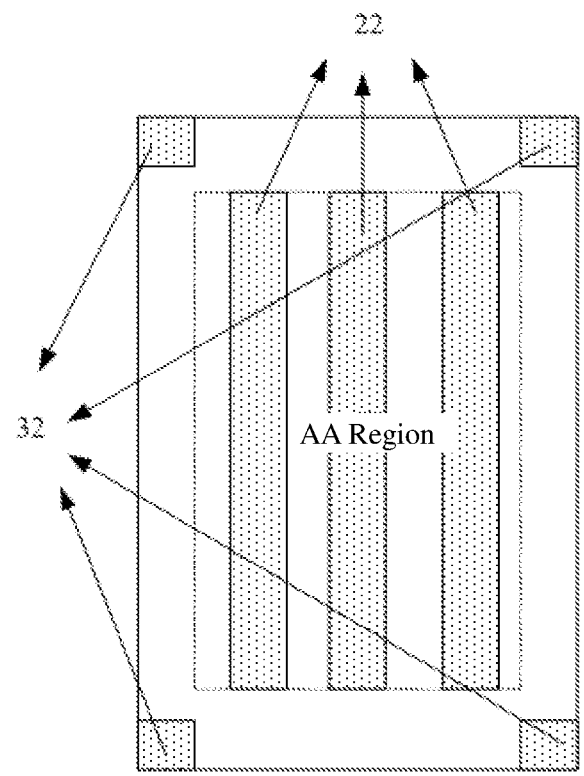
FIG. 3 is a schematic diagram of second electrodes and touch electrodes in the touch screen of embodiment 1 of the present disclosure.

In connection with FIG. 2 and FIG. 3, preferably, the first electrodes 31, the second electrodes 32, the touch electrodes 22 and the sense electrodes 21 are all made of the same material, i.e., the first electrodes 31 and the sense electrodes 21 not only are arranged on the same layer, but also are made of the same material; and the second electrodes 32 and the touch electrodes 22 not only are arranged on the same layer, but also are made of the same material; and thus, patterns of the first electrodes 31 and the sense electrodes 21 can be formed by means of a single patterning process, and patterns of the second electrodes 32 and the touch electrodes 22 can be formed by means of another single patterning process, so that the process steps are simplified, and the production cost is saved.

Further, the materials of the first electrodes 31, the second electrodes 32, the touch electrodes 22 and the sense electrodes 21 all adopt indium gallium tin oxide (InGaSnO), and certainly, also can adopt transparent conductive materials, e.g., Indium Gallium Zinc Oxide (IGZO), Indium Zinc Oxide (IZO), indium tin oxide (InSnO), nano-silver, graphene, carbon nanotubes or the like.

Preferably, in the embodiment, a layer where the first electrodes 31 are positioned and a layer where the second electrodes 32 are positioned are insulated and fixed mutually by adhesive 4. The reason for adopting the adhesive 4 to enable the layer where the first electrodes 31 are positioned and the layer where the second electrodes 32 are positioned to be arranged in an insulated mode is that the adhesive 4 is relatively soft in texture, has a certain elasticity, and is easy to detect a position where a touch occurs, i.e., improves sensitivity of the touch screen, when the touch occurs. The adhesive 4 is preferably an Optical Clear Adhesive (OCA), certainly is not limited to this kind of adhesive 4, and also can adopt other insulating material with elasticity or other adhesive 4 with good elasticity.

As one preferable implementation mode of the embodiment, as illustrated in FIG. 2 to FIG. 4, one pressure sensor 3 is arranged on each of four corners of the touch screen, i.e., the touch screen includes four pressure sensors. Particularly, when a user wants to amplify one image on the touch screen, the user clicks the image by a finger or the like and four pressure sensors can bear the pressure, but relative positions of the four pressure sensors 3 and the touch point are not always the same, the pressures on the four pressure sensors 3 are also different, and thus, the pressures which the four pressure sensors 3 experience need to be integrated to obtain a value so as to amplify the image; and the higher the pressures are, the greater an amplification ratio of the image is.

Certainly, the number of the pressure sensors 3 in the embodiment can be specifically set as required, and the number is not limited to four or the positions are not to the corners, where the pressure sensors 3 are arranged, which is not described in details herein.

Preferably, the touch screen of the embodiment further includes a frame 6, and the frame 6 is arranged outside the display module 1 and is used for packaging a side of the display module 1, which side faces away from the light exiting surface, so as to carry out protection on the touch screen.

The touch screen of the embodiment is applicable to a small-sized touch display apparatus, can be any one of a mobile phone, a pad and a notebook computer, and also can be one of other display products.

It should be noted herein that those skilled in the art generally know that the adhesive 4 between the display module 1 and the touch module and between the touch module 2 and the cover glass 5 also generally adopts the OCA.

Embodiment 2

The embodiment provides a pressure touch detection method of a touch screen. The touch screen can be the touch screen in Embodiment 1. The pressure touch detection method includes: detecting a pressure used for touch, according to a distance variation between a first electrode 31 and a second electrode 32.

Particularly, a variation of capacitance by detecting the distance variation between the first electrode 31 and the second electrode 32 is determined and pressure data according to the variation of the capacitance is calculated, so as to judge the pressure used for touch.

An insulating layer is sandwiched between a layer where the first electrodes 31 are positioned and a layer where the second electrodes 32 are positioned, i.e., a dielectric layer is arranged, and thus, when a pressure is acted on one second electrode 32, the dielectric layer is compressed, a distance between the corresponding first electrode 31 and second electrode 32 is reduced, and according to a plate capacitance formula $C=(\varepsilon \cdot S)/d$, the distance between the electrodes is decreased, and the capacitance is increased. Namely, in the embodiment, in essence, the size of the pressure is detected by measuring the capacitance between two electrodes.

It can be understood that the foregoing embodiments merely are exemplary embodiments of the disclosure, which are adopted for illustrating the principle of the disclosure, but the disclosure is not limited thereto. Those skilled in the art can make various variations and improvements without departing from the spirit and essence of the disclosure, and all the variations and improvements are within the scope of protection of the disclosure.

What is claimed is:

1. A touch screen, comprising a display module and a touch module positioned on a side of a light exiting surface of the display module, the touch module including a plurality of sense electrodes and a plurality of touch electrodes, which are sequentially arranged above the display module, wherein the plurality of sense electrodes and the plurality of touch electrodes are respectively arranged in different layers and are insulated from each other; and the touch screen has a display region and a non-display region surrounding the display region, and at least one pressure sensor is arranged in the non-display region, the pressure sensor includes a first electrode and a second electrode, the first electrode and the sense electrodes are arranged on a same layer, the second electrode and the touch electrodes are arranged on a same layer, and the pressure sensor is configured to detect a touch pressure according to a distance variation between the first electrode and the second electrode, the first electrode, the second electrode, the touch electrodes and the sense electrodes are connected with a touch chip via respective connecting lines, and an electrostatic shielding wire is further arranged in the non-display region of the touch screen, the electrostatic shielding wire surrounds the display region; corresponding connecting lines connected with the sense electrodes and the touch electrodes are positioned on a first side of the electrostatic shielding wire, and corresponding connecting lines connected with the first electrode and the second electrode of the pressure sensor are positioned on a second side of the electrostatic shielding wire, the first side of the electrostatic shielding wire is close to the display region and the second side of the electrostatic shielding wire is away from the display region.

2. The touch screen according to claim 1, wherein the first electrode, the second electrode, the touch electrodes and the sense electrodes are all made of a same material.

3. The touch screen according to claim 2, wherein the materials of all the first electrode, the second electrode, the touch electrodes and the sense electrodes are indium tin oxide.

4. The touch screen according to claim 2, wherein one pressure sensor is arranged on each corner of the touch screen.

5. The touch screen according to claim 2, further comprising a frame, the frame packaging a side of the display module, which side faces away from the light exiting surface.

6. The touch screen according to claim 2, wherein the touch screen is applied to any one of a mobile phone, a pad and a notebook computer.

7. The touch screen according to claim 1, wherein a layer where the first electrode is positioned and a layer where the second electrode is positioned are insulated and fixed mutually by adhesive.

8. The touch screen according to claim 7, wherein the adhesive is an optical clear adhesive.

9. The touch screen according to claim 7, wherein the first electrode, the second electrode, the touch electrodes and the sense electrodes are all made of a same material.

10. The touch screen according to claim 9, wherein the materials of all the first electrode, the second electrode, the touch electrodes and the sense electrodes are indium tin oxide.

11. The touch screen according to claim 9, wherein the adhesive is an optical clear adhesive.

12. The touch screen according to claim 7, further comprising a frame, the frame packaging a side of the display module, which side faces away from the light exiting surface.

13. The touch screen according to claim 1, wherein one pressure sensor is arranged on each corner of the touch screen.

14. The touch screen according to claim 1, further comprising a frame, the frame packaging a side of the display module, which side faces away from the light exiting surface.

15. The touch screen according to claim 1, wherein the touch screen is applied to any one of a mobile phone, a pad and a notebook computer.

16. A pressure touch detection method of a touch screen, for use in the touch screen according to claim 1, the pressure touch detection method comprising:
   detecting a pressure used for a touch, according to a distance variation between the first electrode and the second electrode.

17. The pressure touch detection method of a touch screen according to claim 16, wherein detecting the pressure used for touch according to the distance variation between the first electrode and the second electrode includes:
   determining a variation of capacitance by detecting the distance variation between the first electrode and the second electrode, and calculating pressure data according to the variation of the capacitance, so as to judge the pressure used for touch.

* * * * *